United States Patent [19]

Klein

[11] Patent Number: 5,573,671
[45] Date of Patent: Nov. 12, 1996

[54] METHOD OF AND APPARATUS FOR WATER PURIFICATION

[75] Inventor: Hans-Ulrich Klein, Bad Kissingen, Germany

[73] Assignee: Hans Brochier GmbH & Co., Nurnberg, Germany

[21] Appl. No.: 350,650

[22] Filed: Dec. 7, 1994

[30] Foreign Application Priority Data

Dec. 8, 1993 [DE] Germany .................. 43 41 805.8

[51] Int. Cl.$^6$ ................................. C02F 3/06
[52] U.S. Cl. ................ 210/617; 210/618; 210/792; 210/150; 210/195.1; 210/218; 210/189; 210/274
[58] Field of Search .................... 210/614, 617, 210/618, 792, 104, 120, 150, 151, 189, 218, 274, 195.1

[56] References Cited

U.S. PATENT DOCUMENTS

| | | |
|---|---|---|
| 2,711,465 | 6/1955 | Sanborn .................. 210/120 |
| 3,523,889 | 8/1970 | Eis ........................... 210/715 |
| 4,126,546 | 11/1978 | Hjelmnér et al. ......... 210/793 |
| 4,720,347 | 1/1988 | Berne ...................... 210/189 |
| 4,861,472 | 8/1989 | Weis ........................ 210/189 |
| 4,891,142 | 1/1990 | Hering, Jr. ............... 210/792 |
| 4,931,183 | 6/1990 | Klein et al. . |
| 5,126,042 | 6/1992 | Malone . |
| 5,207,905 | 5/1993 | O'Brien et al. .......... 210/274 |
| 5,227,051 | 7/1993 | Oshima .................... 210/151 |
| 5,277,829 | 1/1994 | Ward ....................... 210/189 |
| 5,429,740 | 7/1995 | Van Der Herberg ..... 210/618 |

Primary Examiner—Peter A. Hruskoci
Assistant Examiner—Theodore M. Green
Attorney, Agent, or Firm—Chilton, Alix & Van Kirk

[57] ABSTRACT

A biological purification process, a secondary treatment of partially cleaned waste water for example, is carried out in a porous bed of loose granules which float in the liquid. The granules are continuously washed to remove coagulated impurities by means of a small quantity thereof being entrained from the top of the bed in a small volumn flow of the effluent of the process, mixed with the inflowing impure liquid and then returned to the bottom of the bed. Excess reaction gas may also be delivered to the bed via the inflowing liquid and unreacted gas collected for reuse.

20 Claims, 1 Drawing Sheet

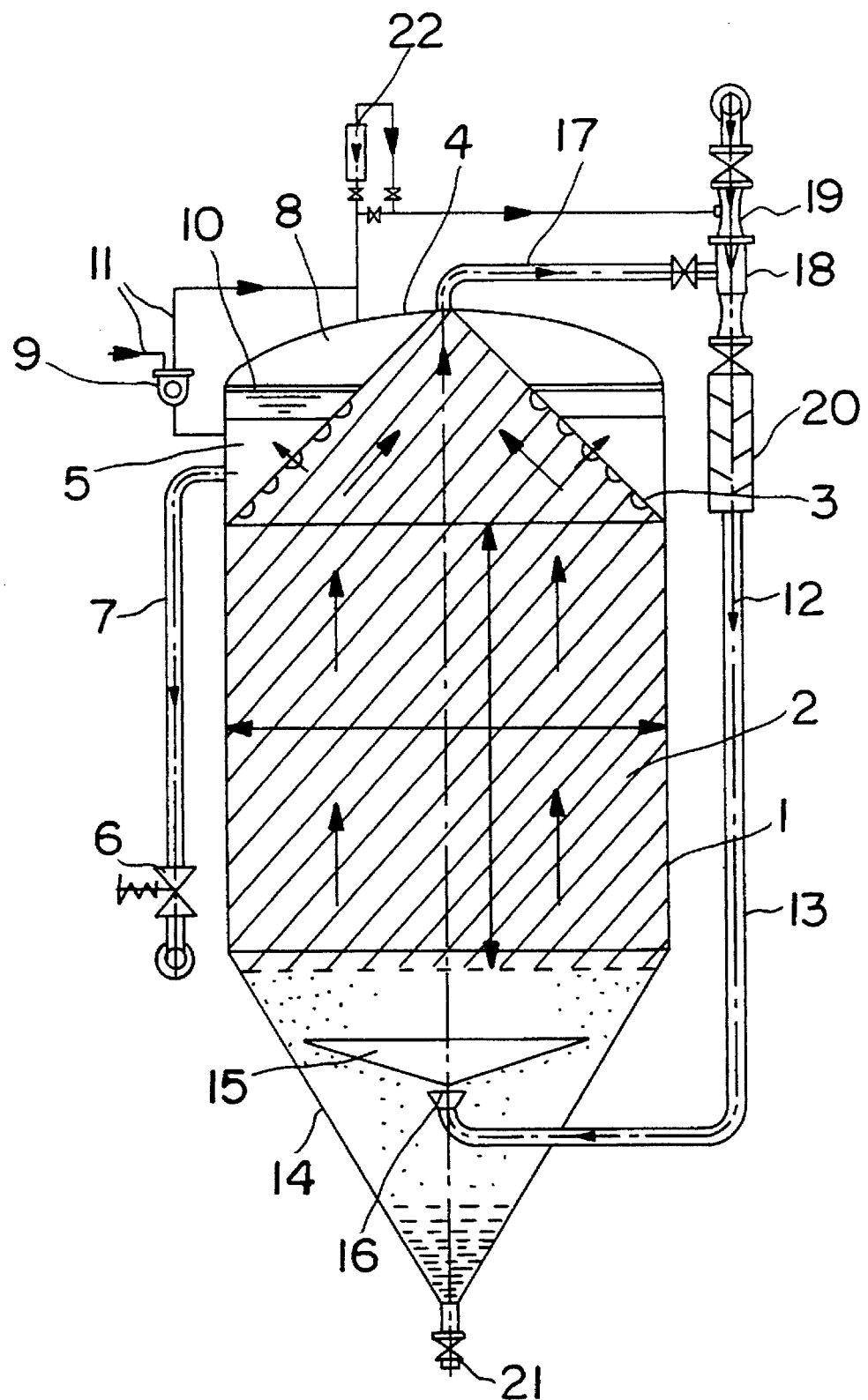

METHOD OF AND APPARATUS FOR WATER PURIFICATION

BACKGROUND OF THE INVENTION

1. Field of the Invention

This invention relates to the biological treatment of water and, particularly, to a secondary treatment process which includes an aerobic or anerobic reaction. More specifically, the present invention is directed to filtration apparatus wherein a liquid feed stream is caused to flow over the surfaces of a granular medium in the presence of a gas necessary for a biological purification reaction and, especially, to a filter wherein the medium on which microbes grow is in the form of a fluidized bed of granules separated by a sieve plate from a clean water collection zone. Accordingly, the general objects of the present invention are to provide novel and improved methods and apparatus of such character.

2. Description of the Prior Art

The biological purification of water is, of course, of great importance and ecological significance. Thus, by way of example, biological reactions are commonly employed in the purification of municipal and/or industrial waste water in order to produce service water and drinking water. Biological purification is customarily used as a secondary treatment, i.e., the waste water delivered thereto will have been subjected to pre-purification. Such pre-purification may be accomplished in collecting or preclarifying tanks. The secondary treatment is often done in a filter vessel to which the waste water from the primary treatment stage is directed. As the waste water flows through the filter vessel it will react with an oxygen rich gas and an aerobic reaction will occur. In such a reaction, the bacteria present metabolize biodegradeable organics in the waste water to produce microbial solvents which are removed by gravity sedimentation. Alternatively, rather than creating an environment with excess dissolved oxygen, biodegradeable organics in the waste water may be converted into suspended organics which flocculate by means of an anaerobic reaction. In either case, to produce an acceptable quality effluent, the filter vessel must contain a material which defines a porous filter having sufficient surface area for microbe growth.

European patent document EP-B-0 227 081 discloses a prior art trickling filter type device for use in water purification. In the device of this publication, the water to be purified is conducted through a closed trickling filter in the presence of a pressurized, oxygen enriched atmosphere whereby the trickling filter functions as a biofilm support. The effluent from the trickling filter passes into a "floating-grain" pressure filter. In the floating grain pressure filter, clean water collects above the floating granular filter material, the upper limit of the bed comprising the floating filter material being limited by a sieve plate. An air cushion is established above the clean water which has passed through the floating-grain filter. In the apparatus of the referenced European patent document, oxygen required for biofiltration in the pressure filter is absorbed by the untreated water in the trickling filter with the result that oxygen consumed in the biofiltration process cannot be replaced. Also the floating grain is cleaned by causing the air cushion to periodically force the clean water downwardly through the floating grain pressure filter. Restated, reverse flow pulses of clean water are forced through the floating grain pressure filter to wash the oxidized, i.e., solid waste, material off the granules of the bouyant filter medium. The waste material washed off the floating grain is collected in a sludge thickener which is situated beneath the trickling filter. The periodic pulsing of the clean water, i.e., the shock-like washing of the floating grain, interrupts the biological process. After each such interruption, the requisite gas pressure within the trickling filter must again be established. Further, the process of the referenced European patent document requires complex apparatus including at least two connected pressure vessels and at least two sieve plates.

Published German patent document DE-C-3 338 170 discloses a filter vessel containing a floating, granular filtration medium wherein the liquid to be purified flows from the top to the bottom of the vessel during the biological purification reaction. In the technique disclosed in this German publication, the cleaning of the filtration medium is carried out in a separate washing vessel which is connected to the filter vessel and disposed at a lower level than the filter vessel. Granules of the filter medium are removed from the filter vessel at the top end thereof and pass into the washing vessel as a result of a pressure differential maintained between the filter and washing vessels. In the washing vessel, the filter granules are washed with clean water. The washed filter material is then allowed to flow back into the filter vessel as a consequence of its buoyancy. The apparatus disclosed in this German patent document is expensive to manufacture and, because the floating grain filter medium is washed in batches, its utilization requires the implementation of relatively complicated and expensive control procedures.

SUMMARY OF THE INVENTION

The present invention overcomes the above-briefly discussed and other deficiencies and disadvantages of the prior art and, in so doing, provides a novel biofiltration process which may be carried out continuously with continuous filter medium washing. The present invention also encompasses apparatus for implementation of this novel process, such apparatus being characterized by reduced complexity, and thus reduced cost, when compared to the prior art.

In accordance with the invention when employed in the secondary treatment of waste water, effluent from a primary treatment system is caused to flow, from bottom to top, through a floating-grain filter. The floating-grain filter is delimited, at its upper end by a sieve plate above which purified water will be collected. The desired or required aerobic or anaerobic process will occur as the partially treated water flows over the surfaces of the bouyant, granular material which defines the floating-grain filter. The granulated filter medium is cleaned by being continuously drawn off with a portion of the clean water, i.e., the effluent of the floating-grain filter. The thus drawn-off clean water and filter medium is introduced into the feed line of the secondary treatment filter and, in the course of such introduction, the granular material is washed to remove oxidized material from the surfaces thereof.

Apparatus in accordance with the present invention includes means for transporting the filter medium granules and clean liquid from the sleeve plate of the floating-grain filter to the feed line for the filter. The transport means will include a conduit for coupling the sieve plate to the feed line which carries the liquid to be filtered, typically the effluent of a primary treatment stage.

In the practice of the invention, incoming impure liquid feed stock and a comparatively small volume stream of clean liquid extracted from the region of the sieve plate are caused to be continuously mixed, the stream of clean liquid also entraining grains of the filter medium. Such mixing can expeditiously be accomplished by employing a transport device which is operated by the flow of feed stock liquid. This mixing results in granular filter material being continuously washed in the feed line for the feed stock liquid and, accordingly, continuous flow with concomitant purification is maintained through the floating-grain filter, i.e., no shut-downs are required for gas pressure to rebuild within the filter. The washing of coagulated matter from the granular filter medium, in accordance with one embodiment of the invention, is accomplished by turbulence-inducing injection of the granular filter material into the feed line for the feed stock liquid.

Additionally, in accordance with the present invention, it is possible to inject an excess amount of the reaction gas required for the biological process occurring within the filter into the feed line for the impure liquid. This technique allows the gas to dissolve directly in accordance with its consumption with unreacted gas collecting above the clean liquid as a gas cushion. Thus, the efficiency of the treatment process is maximized since the reaction supporting gas can be continuously removed from the gas cushion and reinjected into the feed line.

BRIEF DESCRIPTION OF THE DRAWINGS

The present invention may be better understood and its numerous objects and advantages will become apparent to those skilled in the art by reference to the accompanying drawing which is a schematic illustration of a method and apparatus in accordance with a first embodiment of the invention.

DESCRIPTION OF THE DISCLOSED EMBODIMENT

With reference now to the drawing, a floating-grain filter in accordance with the present invention comprises a pressure vessel 1. The bed or mass of granular material which functions as the filter medium is indicated at 2. The grain size of the filter material is advantageously in the range of 1.5 mm to 2 mm thus providing a surface area for the growth of microbes advantageously in the range 1500–2000 $m^2/m^3$. The granular filter material will be bouyant, i.e., will have a specific gravity which is less than that of the liquid being treated, whereby the filter material will float and thus attempt to rise to the top of pressure vessel 1. The upper side of the floating-grain filter 2 will be delimited by a conical sieve plate 3 which has its cone apex pointing upwardly. In the disclosed embodiment, sieve plate 3 contacts the upper wall 4 of pressure vessel 1. Sieve plate 3 is at least partly pervious to the liquid being treated and thus separates the floating grain filter medium from a purified liquid collection zone 5. Restated, considering the situation where the present invention is employed as a secondary waste water treatment stage, water purified by the reaction occuring within the porous mass of submerged granules 2, i.e., on the surfaces of the granules, will be collected in the region 5 above sieve plate 3. This purified liquid may be drawn off for use by an effluent conduit 7 which, in the disclosed embodiment, is furnished with a pressure-release valve 6.

In the disclosed embodiment, a gas cushion is maintained in the region 8 directly below the top 4 of pressure vessel 1. The gas which collects in region 8 is disposed above the purified liquid and is comprised of unreacted gas which supports the biological purification, i.e., biofiltration, process. Thus, if an aerobic reaction is occurring within the floating-grain filter, the gas cushion in region 8 will be oxygen-enriched air or pure oxygen. However, if the reaction occurring within the filter is anaerobic metabolism, the gas defining the cushion within region 8 may expeditiously be methane or hydrogen. The pressure of the gas cushion is kept constant by a controller 9 which is responsive to the level of the purified liquid disposed above sieve plate 3. Thus, if the purified liquid in the region 5 above sieve plate 3 rises above a level indicated at 10, gas will be injected into the pressure vessel via a gas feed line 11 from a source, not shown.

The liquid to be treated, i.e., the feed stock for the filter, is indicated at 12 and is delivered to the bottom of pressure vessel 1 via a feed line 13. The bottom of pressure vessel 1 is designed as a funnel-shaped sludge thickener or collector 14. A conical baffle plate 15 is supported within the funnel-shaped sludge-collector 14 so as to be positioned centrally and below the floating-grain filter medium. The cone apex of baffle plate 15 is directed downwardly. The feed stock stream for the filter, is discharged into pressure vessel 1 immediately below baffle plate 15 via the discharge end 16 of feed line 13. The feed stock liquid 12 then flows upwardly through the floating-grain filter and emerges, as purified liquid, through the sieve plate 3.

The upper portion, i.e., the area adjacent the cone apex, of sieve plate 3 is impervious to the gas comprising the cushion formed in the top region 8 of pressure vessel 1. In the disclosed embodiment, a discharge conduit 17 extends through the wall of pressure vessel 1 and through the sieve plate 3 so as to be in direct communication with the granular filter medium confined by the sieve plate. Conduit 17 forms part of a transport device. Conduit 17 at its discharge end, is coupled to an active device which, in the disclosed embodiment, is a jet pump 18. Jet pump 18 is driven by the impure liquid 12 flowing through feed line 13. The operation of the jet pump 18 will create a low pressure which establishes a flow of purified liquid from the top of the floating-grain filter into the feed line 13 via conduit 17. Granular material comprising the filter is entrained in this flow and is thus mixed with feed stock liquid in jet pump 18. This action results in the washing of the entrained granular material in the jet pump, i.e., the operation of the jet pump causes the granular material to be injected into the untreated liquid in such a manner as to produce turbulence. An intensive cleaning action is exerted on the floating granular material by this turbulence. The operating pressure of the liquid in feed line 13 may be in the range of 4 to 5 bar at a feed rate of, for example, 15 $m^3/h$. The operation of the jet pump 18 may be enhanced by treatment gas drawn from the cushion in the region 8 at the top of pressure vessel 1, the gas being injected into the feed line 13 via injector 19 upstream of jet pump 18.

If deemed necessary or desirable, the above-described washing action may be enhanced by a further turbulence inducing mechanism 20 installed downstream of jet pump 18. In the disclosed embodiment, the mechanism 20 is a conduit provided with chicanes which impart turbulence to the mixture flowing therethrough.

Since the discharge end 16 of feed line 13 is disposed below the level of granular filter material maintained within pressure vessel 1, the granular material drawn off via conduit 17 is continuously resupplied to the floating grain filter. Granular material, feed stock liquid and the coagulated "dust", washed off the granular material by the washing process will be discharged into the sludge collector region 14 of pressure vessel 1 from discharge end 16 of feed line 13. The dirt particles will sediment in the sludge collector 14 while the liquid and granular filter material exiting discharge end 16 will ascend. The baffle plate 15 ensures reliabile separation of the dirt particles from the floating granular material. The sludge collector 14 is provided, at its lower end, with a valve 21 through which sedimented sludge may be removed.

As noted above, reaction gas withdrawn from the gas cushion above the purified liquid may be injected into feed line 13 upstream of jet pump 18 via gas injector 19. Additionally, or in lieu of gas from the cushion in region 8, reaction gas may be delivered into the untreated liquid stream directly from the source via conduit 11. The gas flow is controlled by means of a metering device 22, with associated control valves, located upstream of injector 19 in the direction of gas flow. The inclusion of the gas injector 19 in feed line 13 allows the filtration process to proceed with dissolution of reaction gas in situ in the floating-grain filter as a function of the rate of consumption thereof in the biofiltration process. Any excess gas remaining undissolved will be collected in the gas cushion for reinjection into the impure liquid stream.

The sieve plate 3 can be terminated with its cone apex located below the upper wall 4 of pressure vessel 1. For example, the upper end of the sieve plate 3 may be below the level of purified liquid. In such case, the conduit 17 will be extended so as to have its inlet end positioned for the withdrawal of granular material from the floating-grain filter.

The feed liquid driven jet pump 18 may be supplemented or replaced by means of a driven pump such as, for example, an electric pump.

It should be noted that the formation of a gas cushion in the region 8 at the top of pressure vessel 1 is not required for the practice of the present invention.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In a method for the biological purification of impure water, the method including the flowing of the impure water through a porous filter medium comprising a bed of individual granules having a specific gravity which is less than that of the impure water, the filter medium bed being disposed within a vessel, a biological process occurring at the surfaces of the granules, the biological process being supported by a reaction gas, a collection zone for purified liquid being established in the vessel at the upper side of the filter medium bed, the improvement comprising the steps of:

delimiting the upper side of the filter medium bed by means of a conical shaped sieve plate, the apex of the sieve plate being directed generally upwardly, the collection zone being located above the sieve plate;

continuously supplying to the vessel, at a point below the filter medium bed, a stream of impure water having entrained therein a reaction gas necessary for said biological process;

withdrawing purified water from the collection zone to establish a flow of impure water with entrained reaction gas upwardly through the filter medium bed;

establishing a continuous washing flow of purified water from the region of the apex of the sieve plate at the upper side of the filter medium bed;

entraining filter medium granules in the established washing flow of purified water;

injecting the washing flow of purified water with entrained granules into the stream of impure water with entrained reaction gas upstream of the vessel in such a manner as to cause impurities adhering thereto to be washed from the surfaces of the granules, the washed granules thereafter being returned to the lower side of the filter medium bed by the stream of impure water supplied to the vessel; and collecting impurities washed from the granules in a sludge collection zone at the bottom of the vessel.

2. The method of claim 1 wherein the step of supplying the stream of impure water with entrained reaction gas comprises:

injecting a quantity of reaction gas in excess of that required for the biological purification process into the stream of impure water; and wherein said method further comprises:

collecting unreacted gas in a gas cushion above purified water in the collection zone.

3. The method of claim 2 further comprising the step of:

withdrawing unreated gas from said gas cushion and injecting the withdrawn gas into the stream of impure water with entrained reaction gas upstream of the vessel.

4. The method of claim 1 further comprising the step of:

imparting turbulence to the stream of impure water downstream of the point of injection of the washing flow to ensure thorough washing of the entrained granules.

5. The method of claim 1 wherein the step of establishing comprises:

employing the continuously supplied stream of impure liquid to create a pressure which is lower than the pressure in the region of the filter medium bed at the apex of the sieve plate whereby purified water will be induced to flow from said region to said low pressure area.

6. The method of claim 4 wherein the step of establishing comprises:

employing the continuously supplied stream of impure liquid to create a pressure which is lower than the pressure in the region of the filter medium bed at by the apex of the sieve plate whereby purified water will be induced to flow from said region to said low pressure area.

7. The method of claim 6 wherein the step of continuously supplying a stream of impure water with entrained reaction gas comprises:

injecting a quantity of reaction gas in excess of that required for the biological purification process into the stream of impure water; and wherein said method further comprises:

collecting unreacted gas in a gas cushion above purified water in the collection zone.

8. The method of claim 7 further comprising the step of:

withdrawing unreacted gas from said gas cushion and injecting the withdrawn gas into the stream of impure water with entrained reaction gas upstream of the vessel.

9. Apparatus for use in the biological purification of an impure liquid, said apparatus comprising:

a vessel, said vessel having a vertical axis;

a floating-grain filter disposed in said vessel, said filter being defined by a bed of granules which float in the liquid to be treated, said filter having a downstream top side and an upstream bottom side, a biological reaction occurring at the surfaces of said granules in the presence of a reaction gas;

a conical sieve plate disposed in said vessel so as to be generally coaxial therewith, said sieve plate contacting the uppermost of the granules defining said filter and limiting the vertical movement of the granules whereby a filter at least in part having a conical shape with the apex thereof directed upwardly is established, said conical part of said filter including said top side, a purified liquid collection zone being defined in said vessel immediately above said sieve plate, said sieve plate being at least in part pervious to the liquid to be purified;

sludge collector means disposed at the bottom of said vessel below said floating-grain filter;

means for forming a stream of impure liquid;

means for directing said stream of impure liquid to said vessel, said impure liquid stream directing means comprising conduit means which discharges in said vessel in a region disposed below said floating-grain filter whereby the impure liquid will pass through said filter from the bottom to the top thereof;

means for supplying reaction gas to the impure liquid in said vessel; and means for inducing a flow of purified liquid with entrained granules from the region of the apex of said filter, the granules entrained in said flow thereby being withdrawn from said floating-grain filter at the region thereof disposed vertically at the highest point in the direction of liquid flow through said filter, said flow inducing means being coupled to said stream directing means whereby the purified liquid with entrained granules will be mixed with the stream of impure liquid and impurities adhered to said entrained granules will be washed from said granules and said granules will thereafter be returned to said floating-grain filter at the bottom thereof.

10. The apparatus of claim 9 wherein said means for inducing a flow of purified liquid includes:

pump means operated by the impure liquid stream. directing means whereby the impure liquid stream transports said gas to said filter.

11. The apparatus of claim 9 wherein said means for directing the impure liquid stream to said vessel includes:

means for imparting turbulence to the stream in a region located downstream of the point of coupling to said flow inducing means to thereby enhance the washing of the granules.

12. The apparatus of claim 11 further comprising:

baffle means supported in said vessel intermediate the bottom of said floating grain filter and the discharge of said stream directing means, liquid and washed granules being able to pass about said baffle means and to flow upwardly to said floating grain filter, said baffle means comprising a plate having a generally conical shape with the cone apex being directed downwardly and away from said floating grain filter.

13. The apparatus of claim 9 further comprising:

baffle means supported in said vessel intermediate the bottom of said floating grain filter and the discharge of said stream directing means, liquid and washed granules being able to pass about said baffle means and to flow upwardly to said floating grain filter.

14. The apparatus of claim 13 wherein said baffle means comprise a plate having a generally conical shape with the cone apex being directed downwardly and away from said floating grain filter.

15. The apparatus of claim 14 wherein said means for supplying reaction gas comprises means for causing the reaction gas to be entrained in the stream of impure liquid upstream of the point of coupling to said flow inducing means, the quantity of gas entrained being in excess of that required for the biological purification process whereby a cushion of reaction gas will form in said vessel above said collection zone, and wherein said apparatus further comprises:

means for withdrawing reaction gas from said cushion and delivering the thus withdrawn reaction gas to said impure liquid stream forming means upstream of said coupling point.

16. The apparatus of claim 15 wherein said means for directing the impure liquid stream to said vessel includes:

means for imparting turbulence to the stream in a region located downstream of the point of coupling to said flow inducing means to thereby enhance the washing of the granules.

17. The apparatus of claim 16 wherein said means for supplying reaction gas comprises means for causing entrainment of the reaction gas by the stream of impure liquid upstream of the point of coupling to said flow inducing means.

18. The apparatus of claim 9 wherein said means for supplying reaction gas comprises means for causing the reaction gas to be entrained in the stream of impure liquid upstream of the point coupling to said flow inducing means, the quantity of gas entrained being in excess of that required for the biological purification process whereby a cushion of reaction gas will form in said vessel above said collection zone, and wherein said apparatus further comprises:

means for withdrawing reaction gas from said cushion and delivering the thus withdrawn reaction gas to said impure liquid stream forming means upstream of said coupling point.

19. The apparatus of claim 18 wherein said gas withdrawing means includes:

means for metering the flow of the reaction gas from said cushion.

20. The aparatus of claim 9 wherein said means for inducing a flow of purified liquid includes:

pump means operated by the impure liquid stream.

* * * * *